United States Patent [19]

Michal et al.

[11] Patent Number: 5,486,916
[45] Date of Patent: Jan. 23, 1996

[54] FIBER DEPOLARIZER USING HEATED FIBER COIL AND FUSION SPLICER AND TWO POLARIZATION PRESERVING FIBERS AND METHOD

[75] Inventors: Ronald J. Michal, Wrightwood; James R. Steele, Northridge, both of Calif.; Mark E. Jones, Blacksburg, Va.

[73] Assignee: Litton Systems, Inc., Woodland Hills, Calif.

[21] Appl. No.: 282,684

[22] Filed: Jul. 29, 1994

[51] Int. Cl.6 ..................................................... G01B 9/02
[52] U.S. Cl. .............................................. 356/345; 385/12
[58] Field of Search .................................. 356/345, 350; 385/11, 12, 96, 97

[56] References Cited

U.S. PATENT DOCUMENTS 4,468,085  8/1984  Papuchon et al. ...................... 356/350

5,329,349  12/1994  Patterson et al. ........................ 356/350

FOREIGN PATENT DOCUMENTS 2135475  8/1984  United Kingdom ..................... 385/11

Primary Examiner—Samuel A. Turner
Assistant Examiner—Amanda Merlino
Attorney, Agent, or Firm—Wilfred G. Caldwell; James F. Kirk; Chester E. Martine

[57] ABSTRACT

Apparatus and methods for detecting when the birefringent axes of two polarization preserving fibers have their ends oriented into a position to locate the respective axes at 45 degrees. A fusion splicer and a heating controller for the fiber sensing coil are added to a reciprocal interferometer to produce a predetermined pattern of percent light intensity versus time in the returned light, when the axes are properly aligned for fusing. A computer may control the automatic making of depolarizers by this invention.

6 Claims, 5 Drawing Sheets

FIBER DEPOLARIZER USING HEATED FIBER COIL AND FUSION SPLICER AND TWO POLARIZATION PRESERVING FIBERS AND METHOD

BACKGROUND OF THE INVENTION

1. Field

The invention relates to depolarizers, and more particularly to fiber optic depolarizers, and a fabrication station therefor.

2. Prior Art

High birefringent fiber depolarizers are presently believed to be made by hand in a time consuming process involving the steps of launching light from an optics source into a pair of high birefringent fibers to be fusion joined by a fusion splicer. A DOP (degree of polarization) Analysis Optics measures the quality of the resultant depolarizer. The process is believed to be tedious, involves a low yield and is not compatible with automated manufacturing methods.

SUMMARY OF THE INVENTION

Depolarizers may be made by fusing adjacent ends of two polarization preserving fibers with their principal birefringent axes oriented at 45 degrees to each other.

One way to make such a depolarizer is to use an apparatus for determining when the birefringent axes are oriented at 45 degrees.

In a first embodiment, such an apparatus may comprise a broadband light source connected to an MIOC (multifunction integrated optics circuit or chip) through an input coupler, the MIOC being characterized to polarize light entering the device from an input port and which evenly splits light leaving each of a first and second output ports. The output ports of the MIOC can be high birefringent fiber pigtails. The MIOC can be a Y-Coupler.

The depolarizer to be fabricated will be formed in the invention method from a length of a first and second polarization preserving fiber having an end of each of the polarization preserving fibers fused with their respective birefringent axes at 45 degrees.

A single mode low birefringent fiber optic sensor coil is connected to one of the output ports by optical fiber. The other output of the MIOC is connected to a first polarization preserving fiber and its free terminal core end is placed in a fusion splicer. The second polarization preserving fiber is connected to the other side of the fiber sensor coil and has its free terminal core end placed adjacent, and in alignment with, the free terminal end of the first polarization preserving fiber in the fusion splicer.

A temperature controller is provided for applying heat to the fiber sensor coil. A photodiode is coupled to observe light intensity variations on the light returning from the sensor coil via the MIOC to the input coupler.

As the fiber sensor coil is heated, the intensity of light at the photodetector will vary directly as a function of the degree of polarization (DOP) of light leaving the depolarizer. When the birefringent axes are aligned at 45 degrees, a good depolarizer has been obtained, and the light intensity will vary minimally. The fibers are then fused.

In a second alternative embodiment, a bulk polarizer and a fiber coupler can be substituted for the MIOC, their functions being equivalent in that the polarizer provides the polarizing function of the waveguides in the MIOC and the fiber splitter provides the function of the Y-Coupler.

In a third alternative embodiment, a bulk optic beam splitter can be substituted for the fiber coupler. The broad band light passes through a bulk polarizer for polarization. The polarized light from the polarizer would then be directed to the beam splitter and equal intensity beams would emerge and be coupled to an input of the coil and into one of the polarization preserving fiber lengths.

In yet another alternative embodiment, the invention method can form the depolarizers automatically. Fusion splicers, such as a model made by Fujikura of Japan, are capable of performing the steps of clamping, rotation and fusing in response to commands from an industrial controller or even a small personal computer operating in response to a simple program. The controller or computer responds to signals from signal conditioners, such as a detector conditioner for converting a diode intensity into a digital signal. A temperature conditioner responds to a signal from a temperature sensor adapted to monitor the temperature of the fiber coil. The temperature conditioner translates the temperature of the coil into a digital value and couples the digitized temperature value into the controller. The temperature controller is adapted to be responsive to digital commands from the controller to increase and decrease the temperature of the coil. The fusion splicer is adapted to have an interface connector or connection to be responsive to signal from the controller for clamping, rotating and fusing the ends of the polarization preserving fibers in response to commands from the controller.

DESCRIPTION OF THE PREFERRED EMBODIMENT

In this invention, high quality depolarizers are sought and obtained at low cost, being reduced to a gyro assembly step. The accuracy of aligning the principal birefringent axes at or near 45 degrees determines the quality of the depolarizer, and ultimately the performance of the end single mode product, i.e., gyro or other product.

Figure 1:
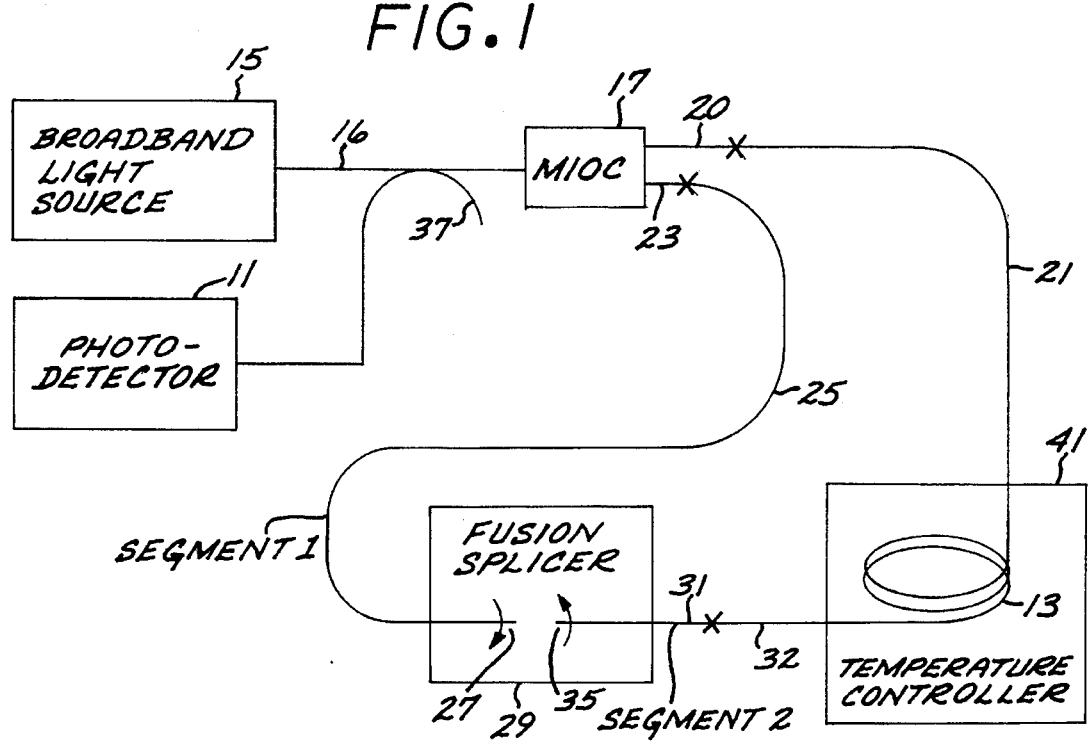
FIG. 1 is a schematic showing of apparatus for determining when the birefringent axes of the polarization preserving fibers are aligned at 45 degrees for fusion.

The invention uses the fiber interferometer formed in FIG. 1 as the means for monitoring the quality of the depolarizer during fabrication by monitoring the output of the interferometer as the fiber sensor coil is heated or cooled. The interferometer must be of the reciprocity type, such as Sagnac, or put together with this characteristic.

Without a depolarizer or with a poorly constructed one, the light intensity at photodetector 11 will vary by large amounts, and in extreme cases completely fade. This occurs due to polarization cross-coupling in the sensor coil.

The depolarizer ensures that light is split evenly between two orthogonal polarization states that coincide with the birefringent axes of the fiber.

A perfect depolarizer has a near zero degree of polarization (DOP) while a system with no depolarizer has a high DOP. Thus, the invention minimizes the DOP by monitoring the intensity of light on the photodetector while the temperature of the low birefringent sensor coil 13 is changed. The DOP and light intensity are directly related.

In FIG. 1, light from broadband source 15 is launched into the interferometer over an optical fiber 16 and through coupler 37 to a multifunction integrated optical circuit or chip (MIOC) 17, which serves to polarize and evenly split the light, such as the Hybrid Optical Junction characterized in U.S. Pat. No. 4,468,085, issued to Papuchon et al on Aug. 28, 1984. The broadband source 15 is any source of light that can be coupled to a single mode fiber. By way of example, source 15 is a 1500 nanometer source.

One output 20 of the MIOC 17 is connected to a first end of a low-birefringent fiber sensing coil 13 over optical fiber 21. The other MIOC 17 output 23 is connected to one end of a first segment 25 of the depolarizer. The other end 27 of the first segment 25 is cleaved and loaded into fusion splicer 29. Coil 13, by way of example, is 200 meter, single mode, fiber about 1 ½ inches in diameter.

One end of the second depolarization segment 31 is attached to fiber coil 13 via optical fiber 32.

The other end 35 of depolarizer segment 31 is cleaved and placed in fusion splicer 29.

Aligning the polarization preserving fibers 25 and 31 allows light to traverse through the system in both directions, recombining at MIOC 17 where the polarizer now serves as an analyzer.

Light is directed to photodetector 11 via fiber coupler 37.

Figure 2:
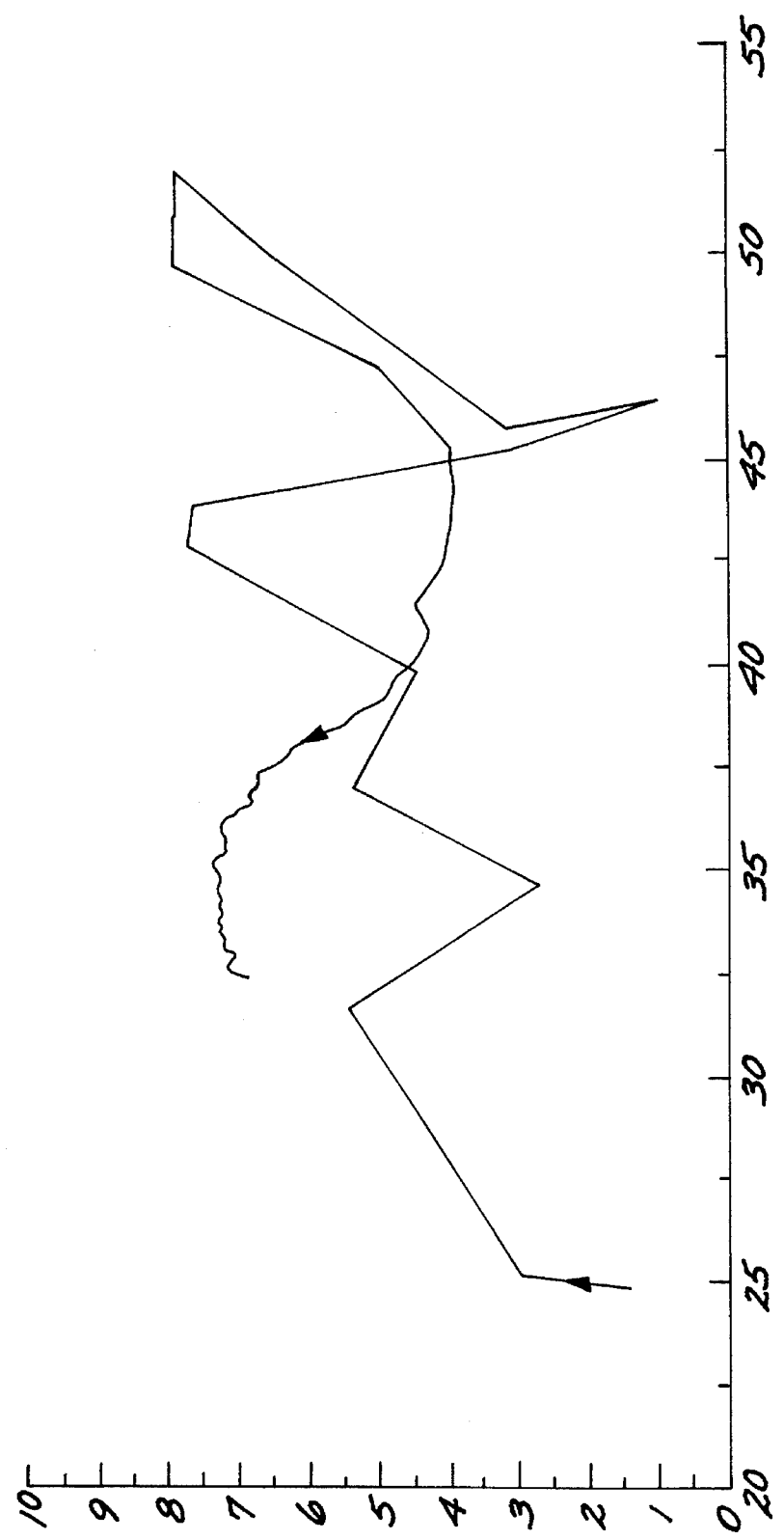
FIG. 2 is a chart of percent of light intensity change vs. temperature when the birefringent axes are at some random angle indicating a non-zero DOP.

The two ends 27, 35 of the depolarizer segments 25, 31 have their cores aligned but the birefringent axes are aligned at some random angle, which when the sensor coil 13 is heated in temperature controller 41, will cause the light intensity on the photodetector 11 to vary as a function of DOP. Data from this condition is shown in FIG. 2 with the X axis being temperature and the Y axis being percent intensity change which provides a measure of the DOP.

Figure 3:
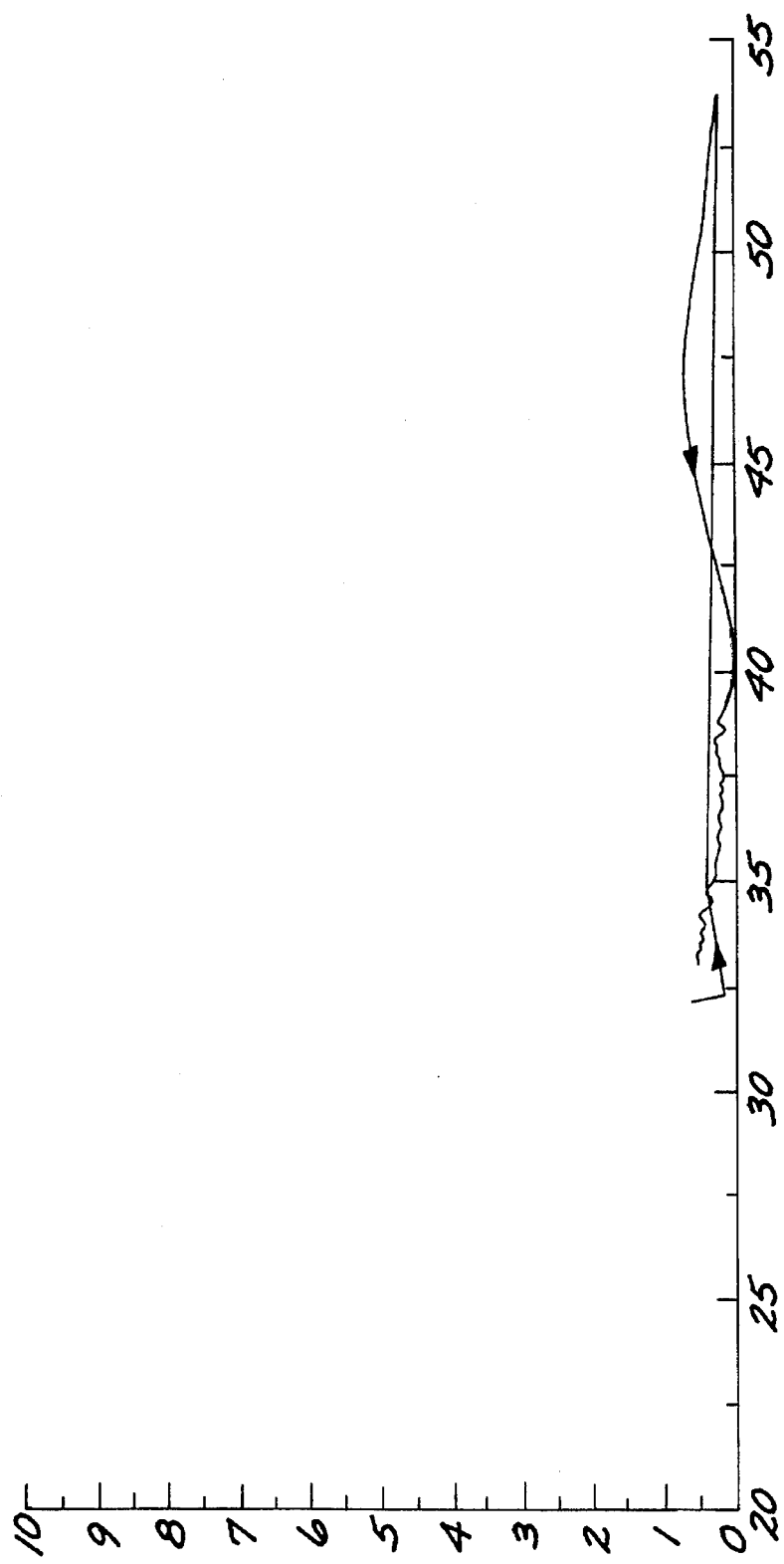
FIG. 3 is a chart of percent of light intensity change vs. when the birefringent axes are aligned at 45 degrees.

Now, the fiber ends in the fusion splicer 29 can be rotated such that the intensity variations are minimized, indicating that a 45 degree relative angle of the principal birefringent axes produces a small DOP (see data plotted in FIG. 3).

Figure 4:
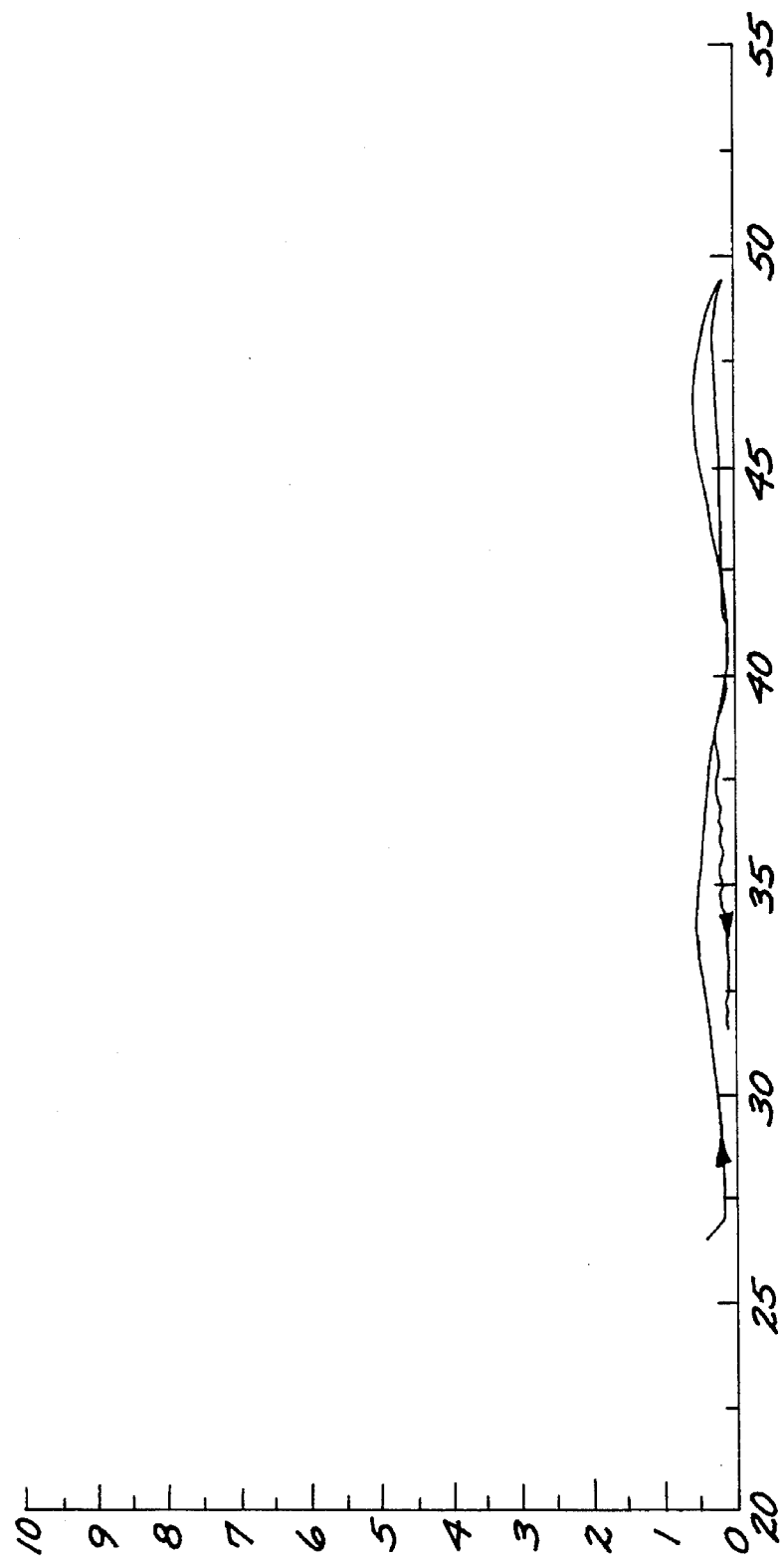
FIG. 4 is a final chart after splicing with the sensor coil heated to provide a measurement of the final degree of polarization.

The ends 27 and 29 are then spliced together and the sensor coil 13 is heated to provide a measurement of the final DOP (see data plotted in FIG. 4).

Measurements can be made both at the DC light level and the modulated light level. By using the modulated light and demodulating with a lock-in amplifier, the DC noise contribution to the signal is removed.

Figure 5:
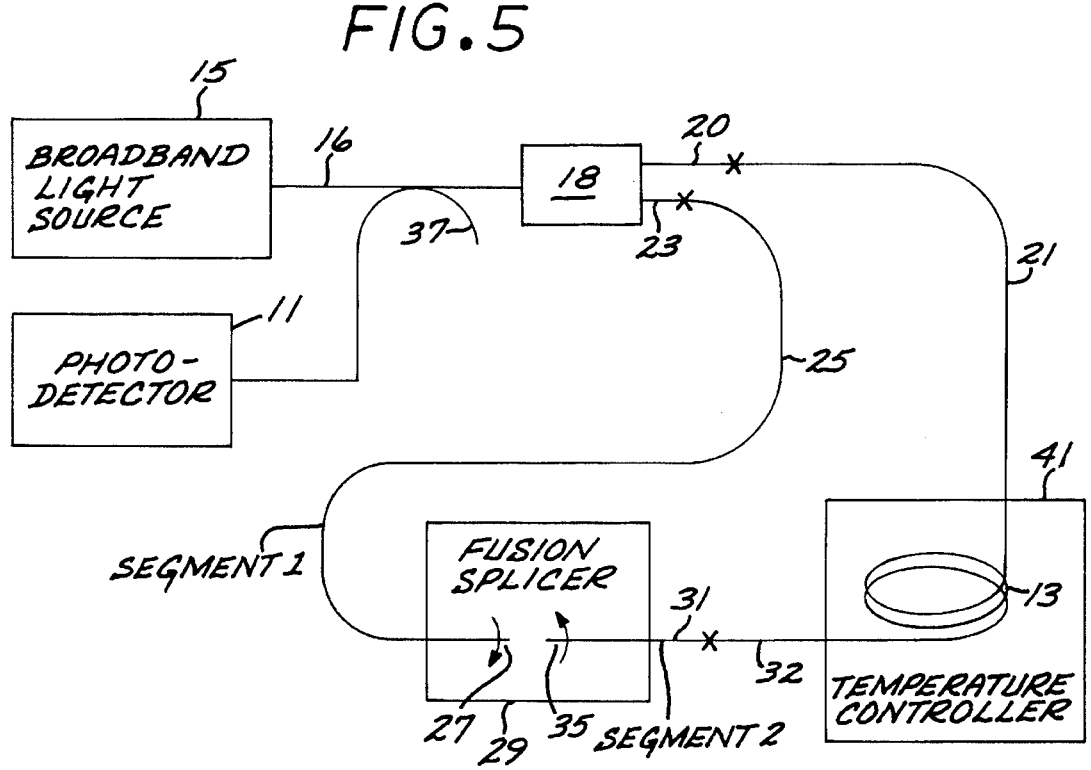
FIG. 5 shows a schematic block diagram that depicts alternative structures for replacing the MIOC.

In FIG. 5, box 18 has been used to replace the MIOC, in order to represent the alternative structures for the identified embodiments. Thus box 18 may be a fiber Y coupler, with two outputs, a polarizer and a beam splitter, and other equivalents. Otherwise, the components and operation of FIG. 5 is the same as FIG. 1.

Figure 6:
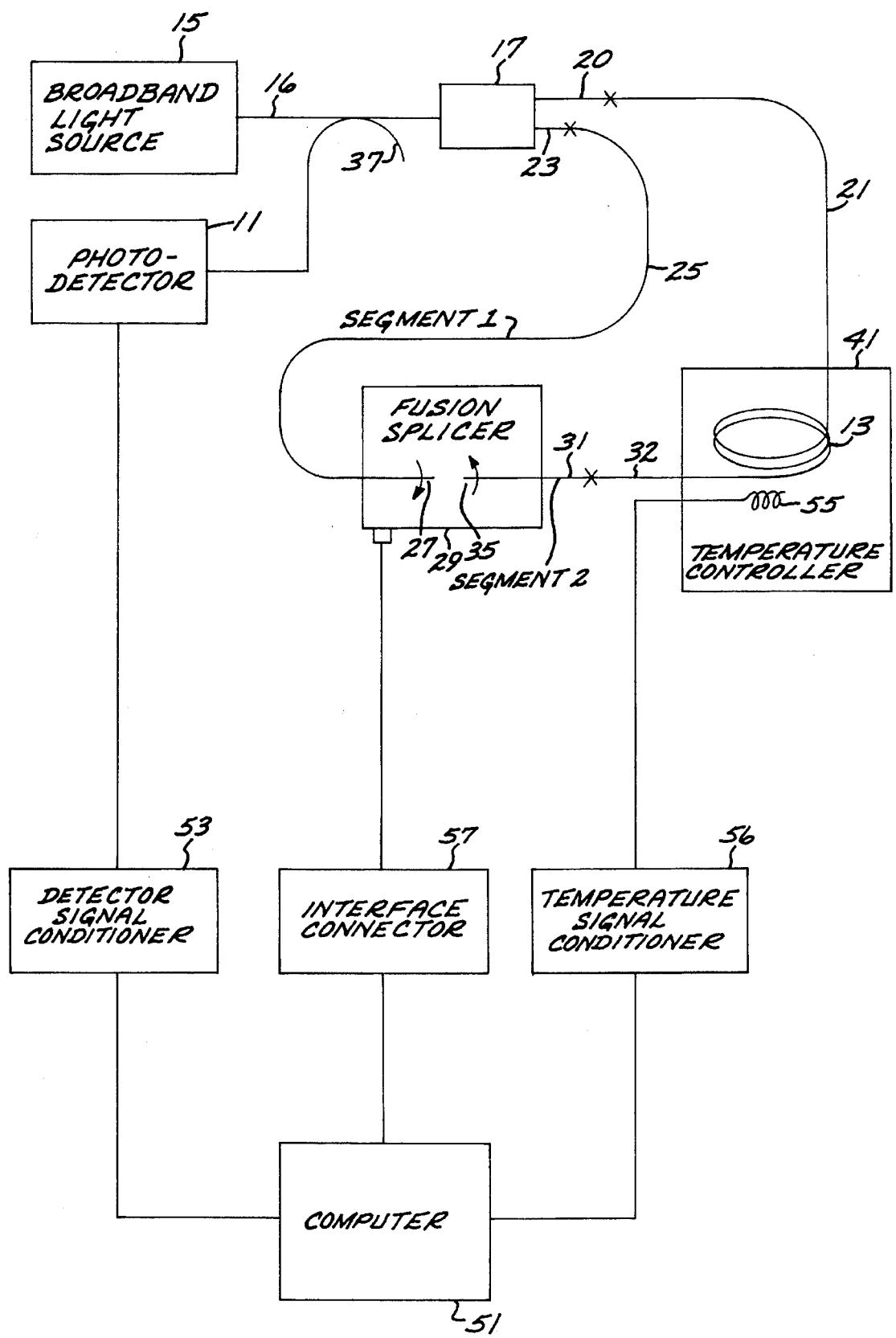
FIG. 6 depicts a schematic arrangement showing a computer or industrial controller for automatically manufacturing fiber depolarizers.

In FIG. 6, the making of birefringent fiber depolarizers is automatic, or at least semi-automatic because the computer 51 (which may be a personal type or an industrial controller) receives a signal from photodetector 11, conditioned in box 53, indicative of light intensity and a temperature signal from sensor 55, via Temperature Signal Conditioner 56, to easily tally percent of light intensity change vs. temperature to optimally recognize the minimal intensity variation, and then, actuate fusion splicer 29 to fuse the fiber ends at the 45 degree aligned axes, via Interface Connector 57, at which time a new depolarizer is started, by manual loading, but the time saved in the automatic detection is of great value. Temperature Signal Conditioner also cycles the Temperature Controller 41, usually to increase and decrease the temperature as in FIGS. 2 and 3.

The light intensity pattern of FIG. 4 is generally the predetermined pattern to be detected for initiating fusing of the ends together.

The principles of the embodiments herein set forth should now be known, and it is clear that other structures and steps could be substituted to accomplish the same ends. Therefore, the invention should only be limited by the appended claims, wherein:

What is claimed is:

1. The method of making a fiber depolarizer by splicing together the ends of two sections of polarization preserving fiber with their respective principal birefringent axes oriented at 45 degrees to each other, comprising the steps of:

using a reciprocal interferometer responsive to light from a broadband source to direct the light through a light polarizer and beam splitter over a first output to a single mode low birefringent fiber optical coil via an optical fiber in one direction;

inserting a fusion splicer, connected to the coil by a polarization preserving fiber and connected to the other output of the splitter by a further polarization preserving fiber for receiving light directed in the opposite direction;

heating the coil to increase its temperature while orienting the ends of the polarization preserving fibers in the fusion splicer; sensing light returning from the beam splitter to detect a predetermined pattern of light intensity versus time; and, fusing said ends upon the detection of said pattern.

2. The method of claim 1, wherein:

controlling said heating by a computer connected to receive signals in accordance with the light being sensed and signals in accordance with the temperature of said coil.

3. The method of claim 2, wherein:

using said computer to detect said predetermined pattern and initiate said fusing.

4. Apparatus for determining when two sections of polarization fiber have their respective principal birefringent axes oriented at 45 degrees to each other comprising in combination:

a broadband light source;

one of a multifunctional integrated optics circuit and an interconnected polarizer and beam splitter having two output circuits;

a low birefringent fiber sensing coil connected to one of said output circuits;

a polarization preserving fiber connected to the other of said output circuits;

a fusion splicer;

a further polarization preserving fiber connected between the sensing coil and the fusion splicer;

each polarization preserving fiber terminating in an end in said fusion splicer; and means for detecting a predetermined light intensity pattern between the broadband source and the multifunction integrated optics circuit or the interconnected polarizer; and fusing said ends upon such detection.

5. The apparatus of claim 4, wherein said detecting means heat said coil at least while the polarization preserving fibers are oriented in the fusion splicer.

6. The method of making a fiber depolarizer, using two polarization preserving fibers, comprising the step of:

establishing a light path from a broadband light source through a multi-function integrated optics circuit where it is evenly split and directed into both ends of a fiber loop connected to the circuit including a first polarization preserving fiber, a fusion splicer receiving an end of the first polarization preserving fiber; a low birefringent fiber coil; for adjacent ends of the preserving fibers a second polarization preserving fiber having an end in the fusion splicer and extending to the fiber coil at one end; the other end of the fiber coil being extended to the circuit; and a temperature controlled fiber sensing coil, adjacent said fiber coil;

heating the coil;

orienting said ends;

detecting a predetermined pattern of light intensity between the source and the circuit when the respective birefringent axes are oriented at approximately 45 degrees; and, fusing said ends.

* * * * *